No. 748,088. PATENTED DEC. 29, 1903.
G. MOORE.
FILTERING SYSTEM.
APPLICATION FILED OCT. 30, 1902.
NO MODEL. 3 SHEETS—SHEET 1.
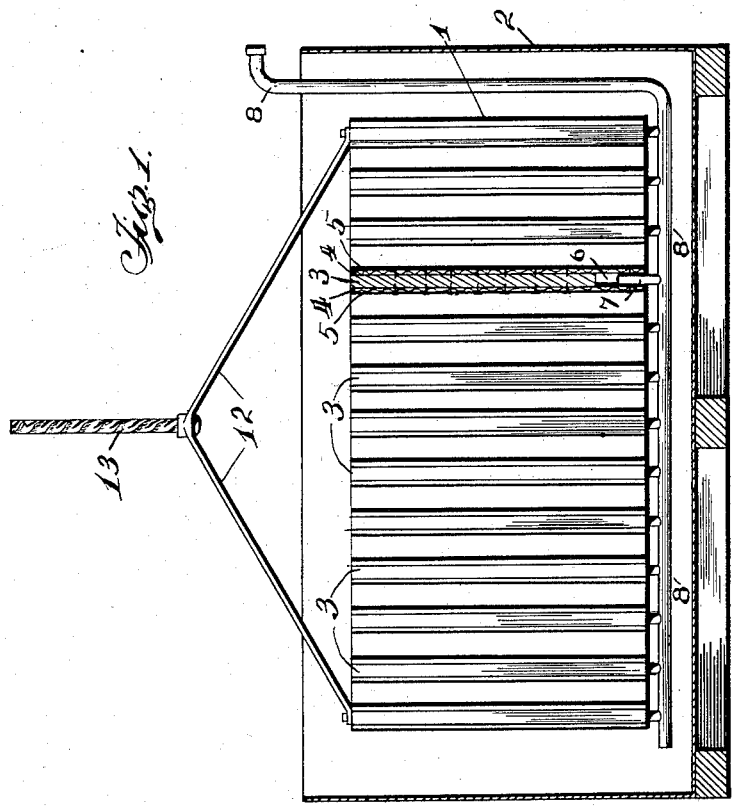
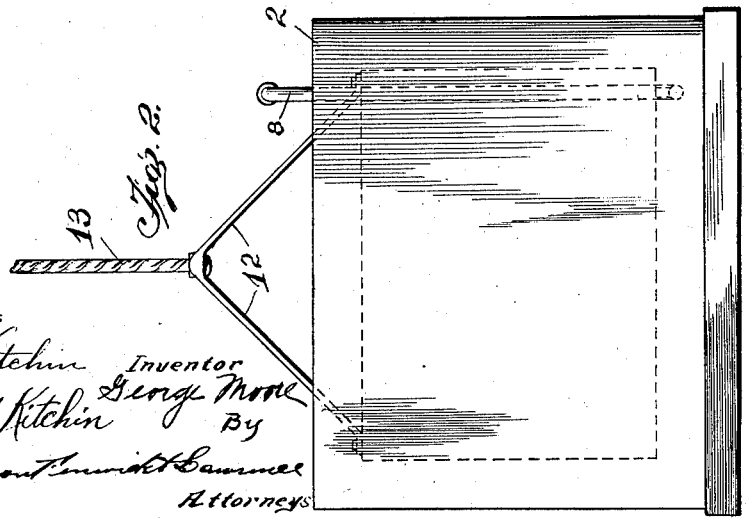

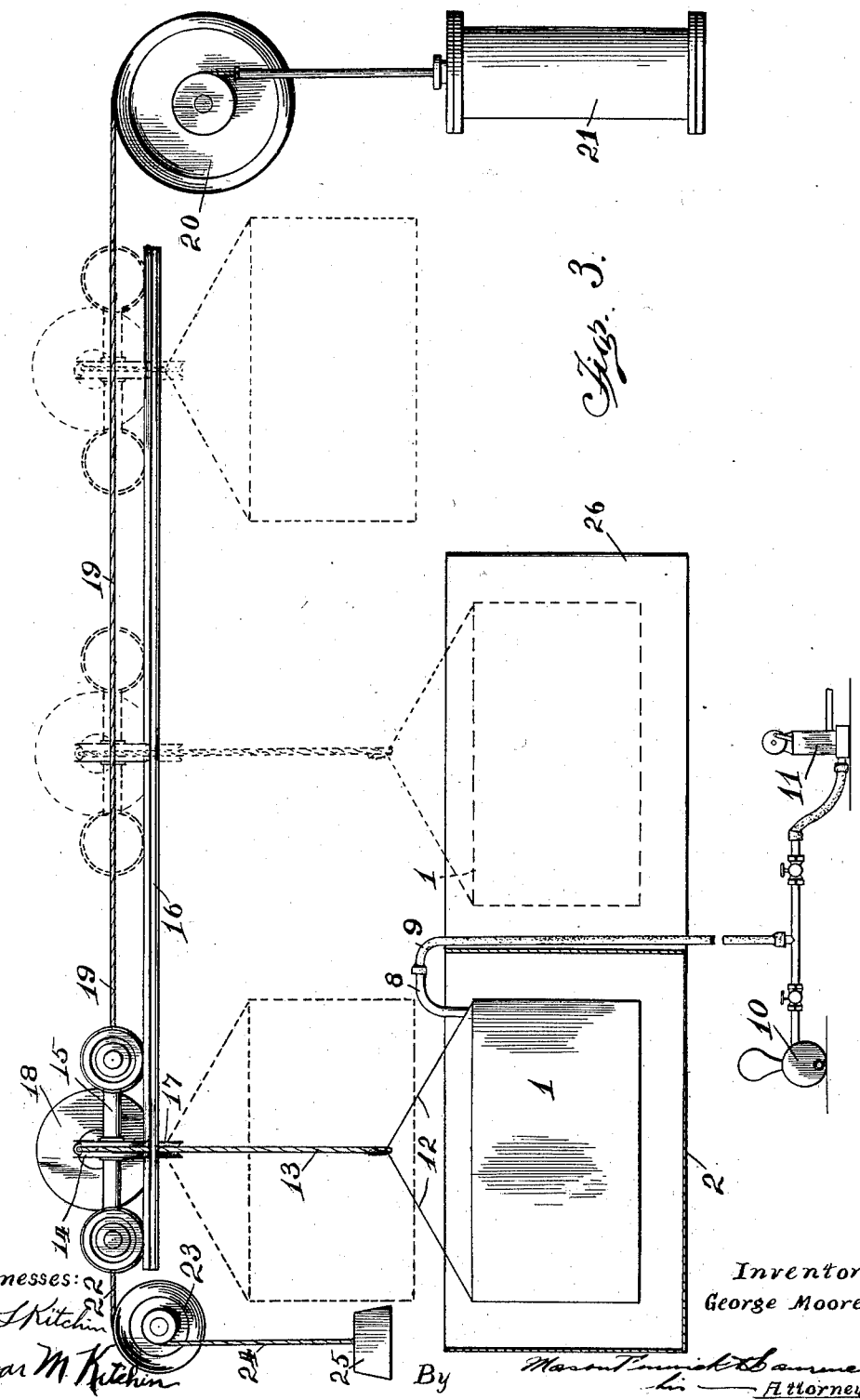

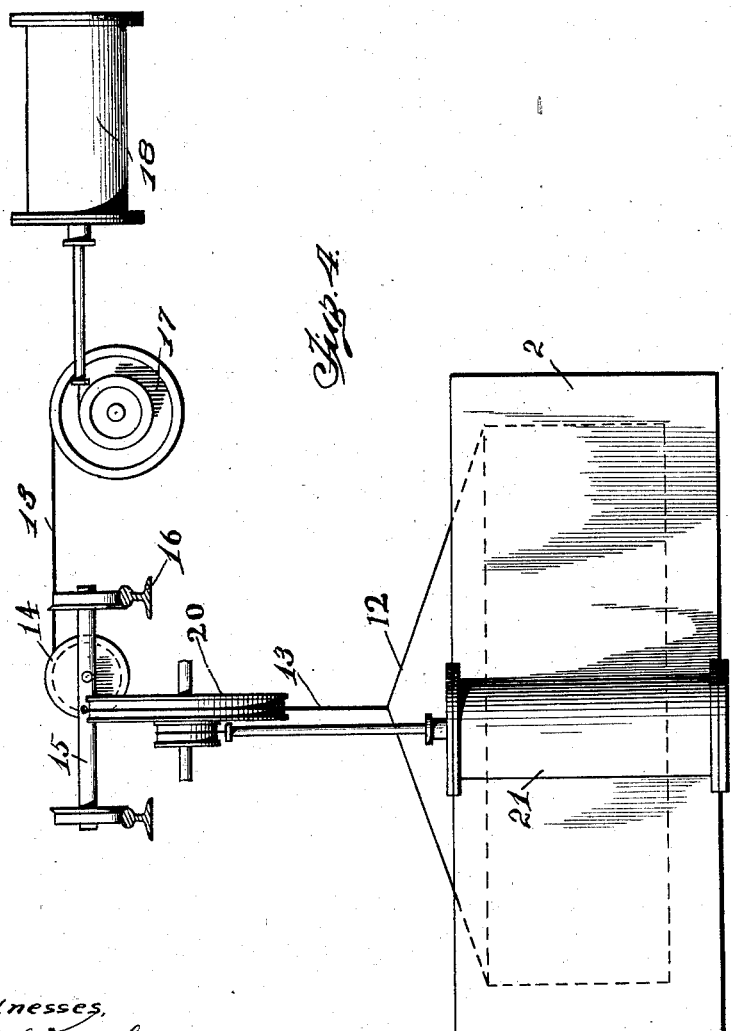

No. 748,088. Patented December 29, 1903.

UNITED STATES PATENT OFFICE.

GEORGE MOORE, OF SALT LAKE CITY, UTAH.

FILTERING SYSTEM.

SPECIFICATION forming part of Letters Patent No. 748,088, dated December 29, 1903.

Application filed October 30, 1902. Serial No. 129,432. (No model.)

*To all whom it may concern:*

Be it known that I, GEORGE MOORE, a citizen of the United States, residing at Salt Lake City, in the county of Salt Lake and State of Utah, have invented certain new and useful Improvements in Filtering Systems; and I do hereby declare the following to be a full, clear, and exact description of the invention, such as will enable others skilled in the art to which it appertains to make and use the same.

My invention relates to improvements in filtering systems; and the object in view is the maintenance of a comparatively clean filtering medium secured by a cleaning operation effected with but a minimum interruption of the filtering operation.

With this and other objects in view the invention consists of a filtering medium, means for subjecting the same to a sucking action, and means for subjecting the same to a blowing action.

It also consists in certain other novel constructions, combinations, and arrangements of parts, as will be hereinafter fully described and claimed.

In the accompanying drawings, Figure 1 represents a longitudinal vertical section through a receptacle, one embodiment of the present improved filter being indicated therein in side elevation, parts being broken away to disclose the interior structure. Fig. 2 represents a view in end elevation of the said receptacle, the filter being indicated in dotted lines. Fig. 3 represents a diagrammatic view of the filter and operating parts connected therewith. Fig. 4 represents an end elevation of the disclosure in Fig. 3.

It is well known in the present art that a filter, particularly of the type designed for operating upon precious-metal-bearing solutions, often becomes clogged and means must be provided for removing the solid matter in order that the filtering operation may continue, and in order to provide for the removal of this solid matter from the filtering medium I employ the elements disclosed in the accompanying drawings, in which the numeral 1 indicates a filter proper in operative position within a tank 2 and made up of a series of filter-plates 3 3, each of the plates 3 having a suitable gauze or wire mesh 4 secured upon each side and a suitable fabric 5 attached to the plate outside said gauze, said fabric and gauze constituting the filtering medium. At the lower end of the plate is formed an opening 6, communicating with the inner surface of the gauze 4 upon each side of the plate and adapted to receive the filtered material and pass the same into a tube 7, communicating with a common discharge-tube 8. The tube 8 is connected by any suitable flexible connection 9 with a hydraulic pump 10 and a compressed-air pump 11. The plates 3 are bound together in any preferred manner and are carried by a bail 12, connected with a cable 13, passed about a sheave 14, mounted upon a suitable carriage 15, traveling on track 16. The cable 13 after passing about the sheave 14 is connected with a winding-drum 17, which in turn is connected with a suitable motor 18, preferably a cylinder, and controlled in any suitable and well-known manner for lifting the cable 13 longitudinally, and thereby raising and lowering the filter 1. The motor 18 and drum 17 of course may be mounted upon any suitable carriage (not shown) for traveling in a parallel plane with the carriage 15. The carriage 15 is moved along its track 16 by means of a cable 19, connected therewith and also connected with a winding-drum 20, which drum is connected with a motor 21, preferably a suitable cylinder, and controlled in the ordinary manner. A cable 22 is connected to the opposite side of the carriage 15 and to cable 19 and passed about a winding-drum 23, about which drum is also wound a cable 24, carrying a weight 25, adapted to normally tend to draw the carriage 15 toward the drum 23, said tendency being overcome in operation by the movement of the drum 20 effected through the motor 21.

In carrying out the filtering operation by the present improved filter I may or may not employ a tank 26 in connection with tank 2, said tank when used containing water for purposes to be described.

In operating the present improved filter the filter proper, 1, is lowered into tank 2, and the pump 10 is operated until the solids collected upon the fabric 5 retard the filtering operation, when the filter 1 is raised out of tank 2 by the mechanism just described and is lowered into tank 26, the pumping operation continuing. The water drawn from tank 26 will have a tendency to remove from the solids the liquid retained thereby and substitute water as the medium held in solution. The filter 1 is next lifted out of the tank 26 and moved longitudinally of track 16 and the action of pump 10 stopped. The pump 11 is now brought into operation and a current of air passed through tube 8 and tubes 7 and through the filtering medium in an opposite direction to that of the movement of the material being filtered, whereby the solids collected on said medium will be dislocated. The filter 1 may now be returned to the tank 2 and the operation repeated.

By the construction described it will be evident that the removal of the solids from the filtering medium may be quickly and effectually accomplished with but a minimum of loss of time from the filtering operation. It is further to be observed that the employment of tank 26 and the introduction of a filter thereto may be omitted and the filter as effectually operated; but I find it sometimes desirable to employ said tank 26 as a means for preventing the loss of the solution which may be retained by the solids. When a tank 26 is not employed, the filter 1 is simply lifted from tank 2 and a current of air passed in a reverse direction through the filtering medium for removing the solids therefrom and said filter again placed within the tank for further operation.

While the present invention is susceptible of use in connection with the filtration of water, it is designed particularly for metallurgical operation and especially for the extraction of precious metals from slimes, although I do not by this explanation desire to be understood as limiting the present improved structure to a given operation.

Although I have specifically set forth the particulars of an embodiment of the present invention, yet it will be understood that I do not desire to limit myself to the precise structure specified, but shall feel at liberty at all times to deviate therefrom to any extent within the spirit and scope of the present invention.

The present application sets forth a structure adapted for use in connection with the carrying out of an improved filtering process; but in the present application I have claimed only the mechanical structures, having presented claims for the process in my copending application filed October 30, 1902, and designated by Serial No. 129,433.

Having thus fully described my invention, what I claim as new, and desire to secure by Letters Patent, is—

1. In a filtering system, the combination with a tank for containing the material to be filtered and a cleansing-fluid tank, of a filter, means for introducing and removing the same into and from each of said tanks alternately, means for drawing the contents of said tanks through the filter, and means for cleansing the filter.

2. In a filtering system, the combination with a suitable tank, of a filter proper, means for introducing and removing the same to and from said tank, means for drawing the material contained in said tank through the filter while within the tank, means for introducing said filter proper into a cleansing medium after removal from said tank, and means for passing a current of air through said filter in a reverse direction to the movement of the material being filtered, substantially as described.

3. In a filtering system, the combination with a suitable tank for containing the material to be filtered, of a filter comprising a plurality of plates, filtering means carried thereby, and a tube communicating with the interior of said filtering means, means for introducing and removing said filter proper into and from said tank, means for drawing the material contained in said tank through said filtering medium and through said tube, and means for passing a cleansing-current through said tube in a reverse direction to the movement of the material being filtered, substantially as described.

4. In a filtering system, the combination with a tank for containing the material to be filtered and a cleansing-fluid tank, of a filter, means for introducing and removing the same into and from said tanks alternately, means for drawing the contents of said tanks through said filter, and means for removing foreign substances from the surface of said filter after its removal from the tank containing the cleansing fluid.

5. In a filtering system, the combination with a tank for containing the material to be filtered, and a tank for containing a cleansing liquid, of a filter, means for introducing and removing the same into and from the first-mentioned tank, and for introducing and removing the same into and from the second-mentioned tank, means for drawing the material contained in the first-mentioned tank through the filtering medium while the filter is within the tank, and for drawing the liquid from the second-mentioned tank through the filter while therein, and means for passing a cleansing-current through said filter in an opposite direction to the movement of the filtered material, substantially as described.

6. In a filtering system, the combination with a tank for containing the material to be filtered, and a water-tank, of a filter, means for introducing and removing the same into and from each of said tanks alternately, means for drawing the contents of said tanks through the filtering medium, and means for passing a current of air through the said filtering medium in an opposite direction to the movement of the material being filtered, substantially as described.

7. In a filtering system the combination with a tank containing the material to be filtered, of a filtering medium, means for alternately introducing said medium into and removing the same from said tank, means for drawing the contained material through said filtering medium while in the tank, and means for passing the cleansing-current in a reverse direction to the movement of the filtered material while said medium is outside the tank, substantially as described.

8. In a filter, the combination with a filtering medium, of top extending into said medium and pumps connected therewith for producing in a continued operation an alternate drawing and blowing action, substantially as described.

9. In a filtering system the combination with a suitable filtering medium, of a tube communicating with the interior thereof, and pumps for producing an alternate drawing and blowing action within said tube while permitting the tube to remain in a given fixed position relative to the medium, substantially as described.

10. In a filter, the combination with a suitable receptacle for the material to be filtered, of a filter proper, means for introducing the same into and removing the same from said receptacle, means for producing a drawing action through the said filter while in the receptacle, means for passing a cleansing-current through the same outside the receptacle, and mechanism for controlling the said drawing means and cleansing-current-actuating means relative to the position of the filter, substantially as described.

11. In a mechanism of the class described, the combination with a filter proper, of means for producing a drawing action, means for producing a blowing action thereon, means for introducing and removing said filter into and from the material to be filtered, and mechanism for controlling the said drawing and blowing action relative to the position of said filter, substantially as described.

12. In a mechanism of the class described, the combination with a filter proper, of means for introducing the same into the material to be filtered and removing the same therefrom, means for producing a drawing action, means for passing a cleansing-current in a reverse direction to said action, and mechanism for controlling said drawing and cleansing means relative to the position of the filter proper, substantially as described.

13. In a mechanism of the class described, the combination with a filter proper, of means for introducing the same into the material to be filtered and removing the same therefrom, a hydraulic pump, an air-pump, common communicating means between said pumps and said filter, and means for controlling the action of said pumps upon the filter relative to the position of the filter, substantially as described.

In testimony whereof I hereunto affix my signature in presence of two witnesses.

GEORGE MOORE.

Witnesses:
A. L. HOPPOUGH,
J. B. HAWKES.